United States Patent [19]

Stevenson

[11] Patent Number: 5,621,258
[45] Date of Patent: Apr. 15, 1997

[54] TOY MOTOR WITH PARTIAL COIL ROTOR

[76] Inventor: William W. Stevenson, 8895 Jane Rd. North, Lake Elmo, Minn. 55042

[21] Appl. No.: 535,980

[22] Filed: Sep. 29, 1995

[51] Int. Cl.$^6$ .................................................. H02K 23/00
[52] U.S. Cl. .................................................. 310/1; 310/46
[58] Field of Search .................................. 310/1, 46, 261

[56] References Cited

U.S. PATENT DOCUMENTS

| | | |
|---|---|---|
| 498,585 | 5/1993 | Still . |
| 1,223,375 | 4/1917 | Elliott . |
| 1,232,676 | 7/1917 | Fisher . |
| 1,857,209 | 5/1932 | Moore . |
| 2,446,296 | 8/1948 | Movitz ................... 172/36 |
| 2,488,223 | 11/1949 | Moos ...................... 172/36 |
| 3,109,946 | 11/1963 | Pontin .................... 310/46 |
| 3,445,692 | 5/1969 | Kato ...................... 310/42 |
| 3,678,310 | 7/1972 | Munn et al. ......... 310/40 MM |
| 4,314,169 | 2/1982 | Rusu ..................... 310/46 |

OTHER PUBLICATIONS

How to Make and Use Electric Motors: Al g. Renner; 1974; Toronto, Canada.
American Science and Surplus Catalog; p. 28; Published Sep./Oct. 1995; Skokie, IL 60076.
The World's Simplest Motor Instructions; copyright 1994; Yeany Educational Products; Palmyra PA 17078.

*Primary Examiner*—Steven L. Stephan
*Assistant Examiner*—Nicholas Ponomarenko
*Attorney, Agent, or Firm*—Robert J. Harter

[57] ABSTRACT

A toy motor includes a partial coil rotor, a permanent magnet, a commutator, and has a battery as its base. The rotor winding, rotor shaft, and commutator are all incorporated into a single-wire conductor. The extremely simple rotor clearly demonstrates the operating principle of a motor for amusement and educational purposes.

20 Claims, 3 Drawing Sheets

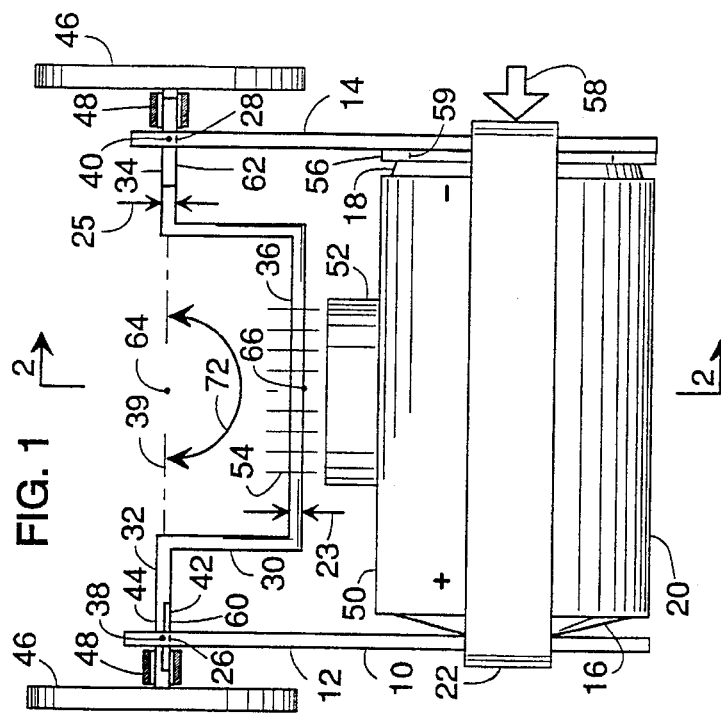
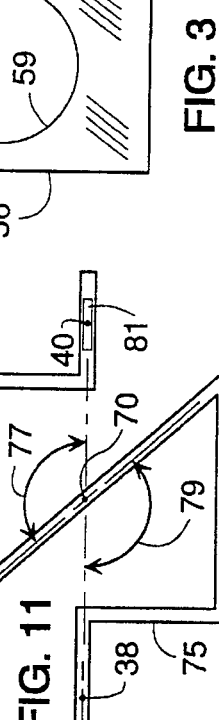
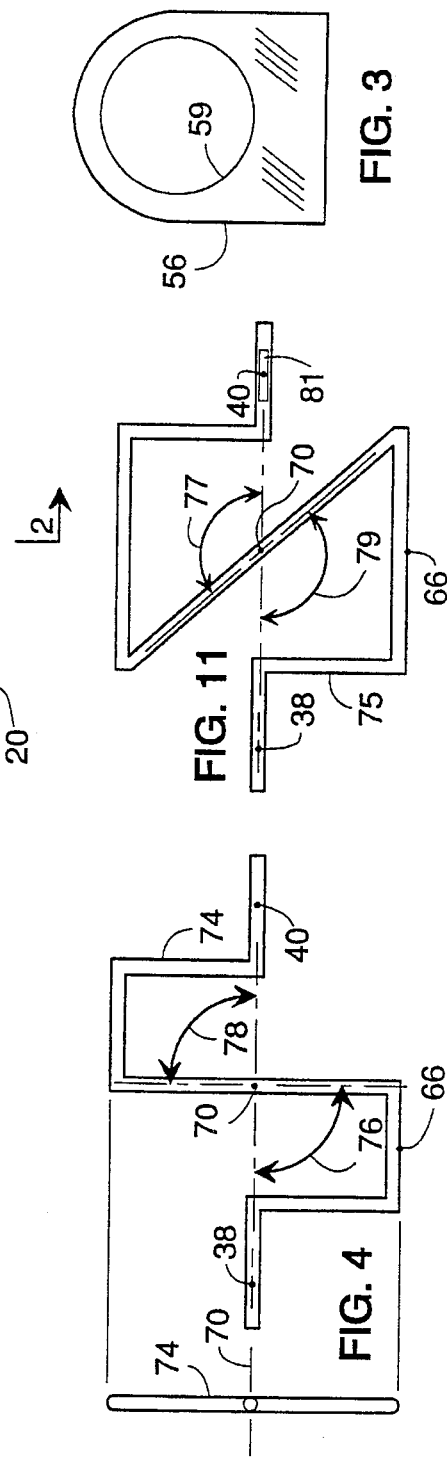
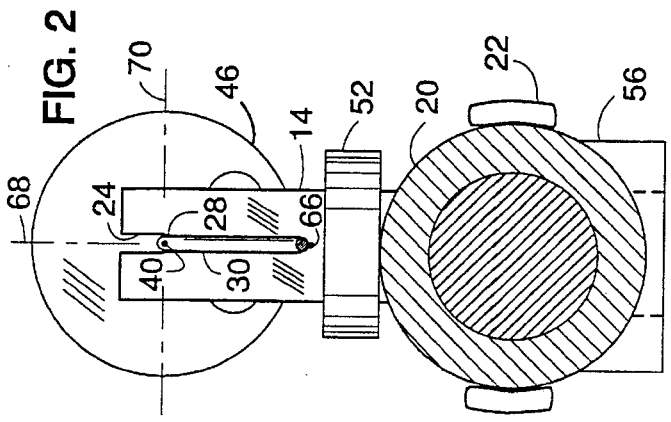
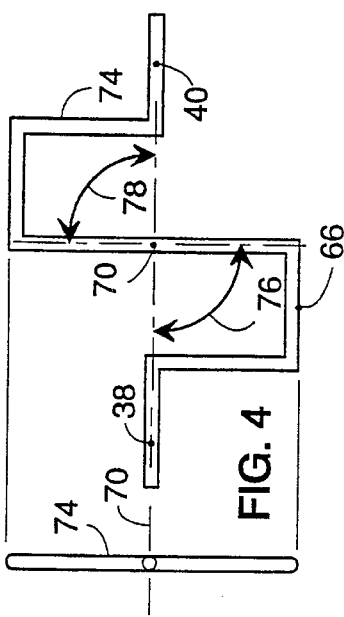

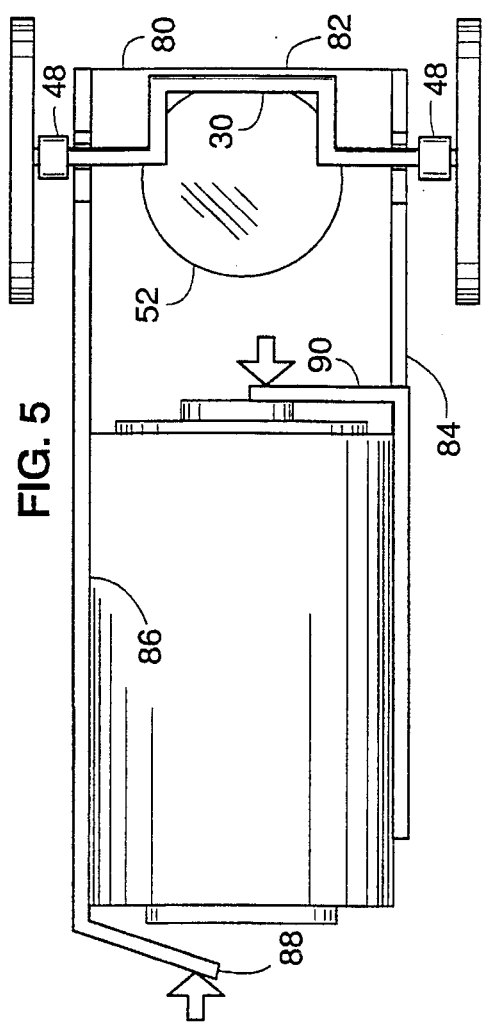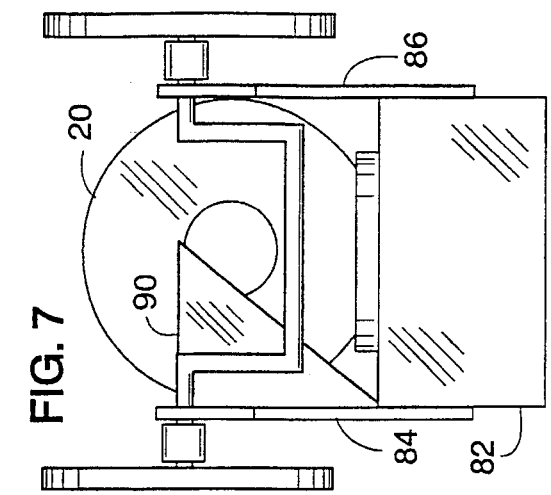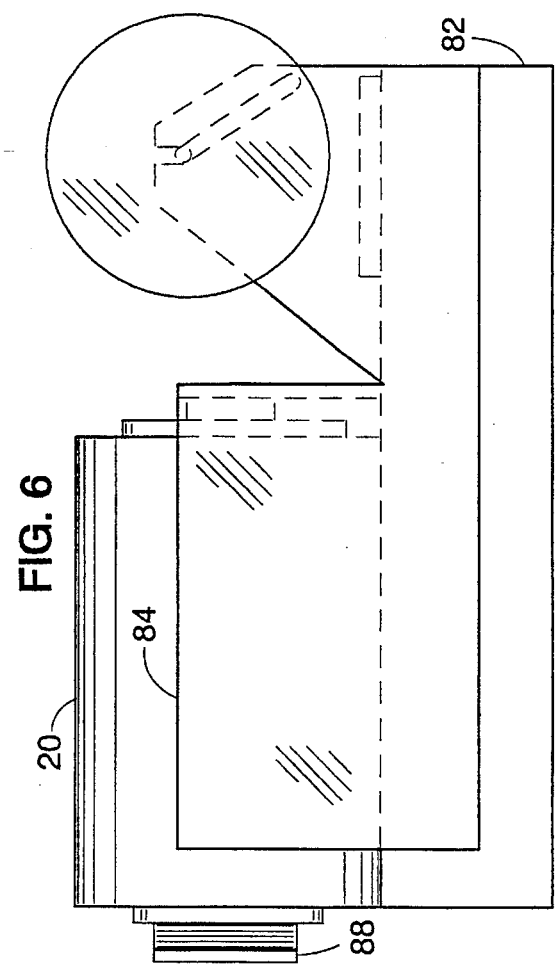

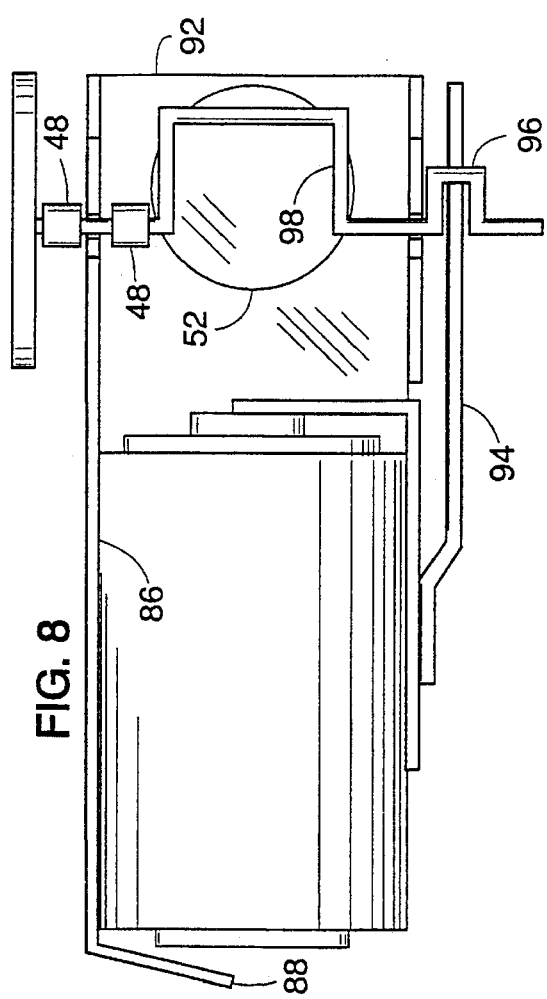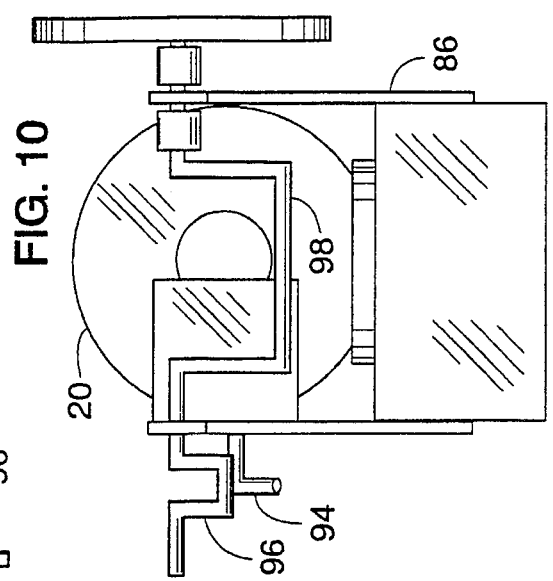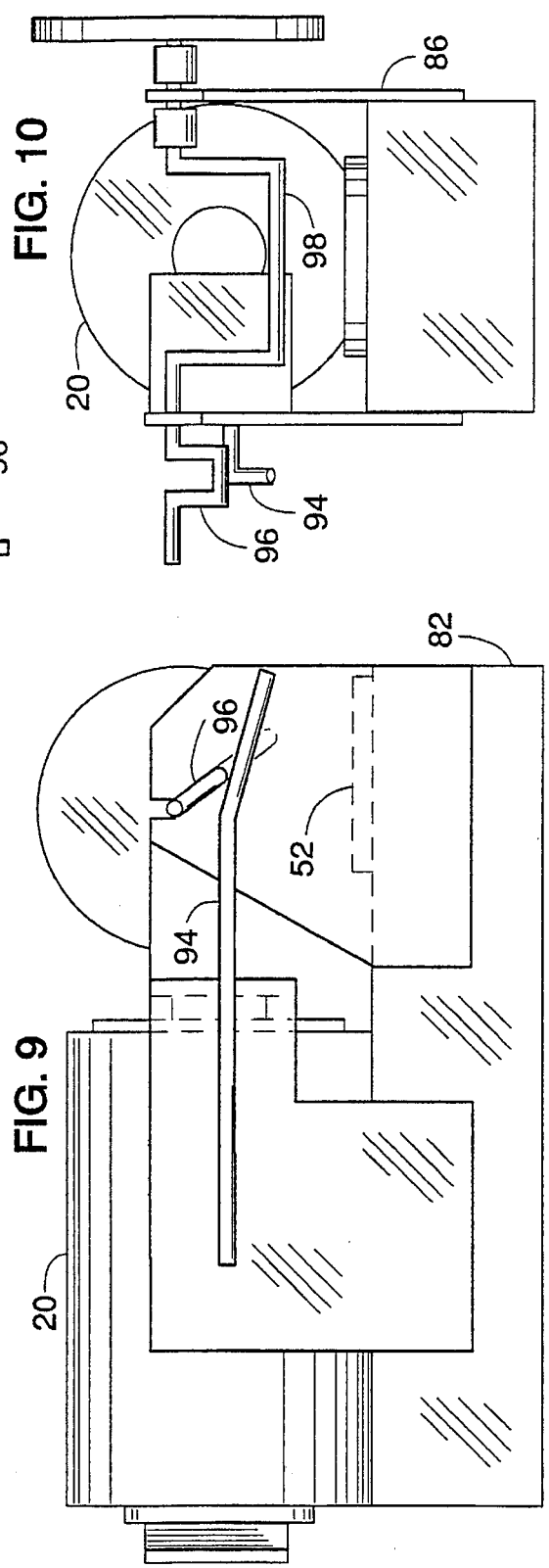

TOY MOTOR WITH PARTIAL COIL ROTOR

BACKGROUND OF THE INVENTION

1. Field of the Invention

The subject invention generally pertains to motors, and more specifically to a toy motor with a partial coil rotor.

2. Description of Related Art

Possibly the simplest motor to date is one whose rotor shaft and rotor windings are made of the same conductor, and whose base consists of the battery that powers it. Such motors, however, have multiple loop coils that are heavy relative to their single conductor supporting shaft. As a result, the rotor shaft tends to bend, and the motors often fail to run due to rotor imbalance.

SUMMARY OF THE INVENTION

To avoid the limitations of existing simple motors, it is an object of the invention to provide an ultra-simple motor whose rotor is a single-pass conductor that clearly demonstrates the operating principle of a motor for amusement and instructional purposes.

Another object is to provide a rotor whose rotor shaft and rotor winding have substantially the same diameter.

Another object is to incorporate a rotor winding, rotor shaft, and a commutator into a single-wire conductor.

Another object is to provide a motor (less the battery) that is light enough to mail by way of "first class-letter size," i.e., not exceeding one ounce and not exceeding 6.125 inches by 11.5 inches.

Another object is to provide a simple on-off switch using a thin insulator between a battery terminal and a rotor support.

Another object is to use the switch's thin insulator to provide the motor with a more stable base.

These and other objects of the invention are provided by a novel toy motor having a battery as its base, a partial coil rotor, a commutator, and permanent magnet. The rotor winding, rotor shaft, and commutator are all incorporated into a single-wire conductor.

BRIEF DESCRIPTION OF THE DRAWINGS

FIG. 1 is a front view of one embodiment of the invention having a partial coil rotor formed less than 36° degrees.

FIG. 2 is a cut-away view of FIG. 1.

FIG. 3 is a thin plastic spacer used to switch the motor of FIG. 1 on and off.

FIG. 4 shows a partial coil rotor formed less than 190 degrees.

FIG. 5 is a top view of another embodiment of the invention.

FIG. 6 is a front view of FIG. 5.

FIG. 7 is an end view of FIG. 6.

FIG. 8 is a top view of another embodiment of the invention.

FIG. 9 is a front view of FIG. 8.

FIG. 10 is an end view of FIG. 9.

FIG. 11 shows a partial coil rotor formed less than 320 degrees.

DESCRIPTION OF THE PREFERRED EMBODIMENT

A toy motor 10 shown in FIGS. 1 and 2 includes two electrically conductive sheet metal rotor supports 12 and 14. A first rotor support 12 and a second rotor support 14 are attached to a positive terminal 16 and a negative terminal 18 of a D-size battery 20 by way of a resilient rubber band 22. Rotor supports 12 and 14 each include a notch 24 to provide a first journal bearing 26 and a second journal bearing 28. Journal bearings 26 and 28 are circumferentially open for receiving a partial coil rotor 30. Rotor 30 includes a first journal 32 and a second journal 34 with a conductor 36 between the two. First journal 32 rotates within first journal bearing 26 at a first journal point 38, and second journal 34 rotates within second journal bearing 28 at a second journal point 40. Points 38 and 40 define a rotational axis 39 about which rotor 30 rotates. A commutator 42 is provided by an interrupted coating of electrical insulation 44 that is distributed circumferentially around first journal 32. This alternately makes and breaks electrical continuity between first journal 32 and first rotor support 12 as rotor 30 rotates. Rotor 30 includes a flywheel 46 at each end that counterbalance the offset weight of conductor 36. Electrically insulated sleeves 48 axially center rotor 30 between rotor supports 12 and 14. Attached to a side wall 50 of battery 20 is a magnet 52 whose magnetic field 54 extends across conductor 36.

For an on-off switch, a thin plastic spacer (FIG. 3), referred to as a spacer switch 56 is placed between second rotor support 14 and negative terminal 18 to just barely break the electrical continuity between them. Continuity is restored by applying manual pressure as intricated by arrow 58. This deflects second rotor support 14 through hole 59 and against negative terminal 18 to turn on motor 10. In one embodiment of the invention spacer switch 56 is broad and flat at the bottom to provide motor 10 with a more stable base. It should be noted, however, that spacer switch 56 represents any electrical insulator between battery 20 and one of the rotor supports and includes but is not limited to adhesive tape, plastic sheet, and insulated coatings.

Once turned on, electrical current supplied by battery 20 is delivered to conductor 36 via a conductive rotor supports 12 and 14 and journals 32 and 34. Current passing through conductor 36 and across magnetic field 54 urges rotor 30 to rotate. Insulation 44 is generally distributed around first journal 32 such that electrical continuity between first rotor support 12 and first journal 32 is maintained when conductor 36 is near magnet 52 and is distributed such that continuity is broken when conductor 36 is further away from magnet 52. In one embodiment of the invention, journals 32 and 34 and conductor 36 are insulated wire with portions 60 and 62 being uninsulated. However, similar results can be accomplished with journals 32 and 34, and conductor 36 being essentially bare wire with only a small insulated patch on one journal (circumferentially opposite of area 42) to provide commutation. Conductor 36 has a conductor diameter 23 that is substantially equal to a journal diameter 25 of journals 32 and 34 disregarding dimensional factors of any insulation that may be on rotor 30.

A significant amount of experimentation was involved in finding a balance between the electrical and mechanical characteristics of rotor 30. Pure copper has a relatively low resistivity of 2.03 micro-ohm-centimeters and is readily available in the form of insulated wire, however, pure copper has relatively low rigidity. Materials having greater rigidity often tend to have greater resistivity and are often not readily available in the form of insulated wire. A balance was found by using more rigid materials such as beryllium-copper alloys, phosphor-bronze, and red copper having an electrical resistivity greater than 3 micro-ohms-centimeters. These more rigid alloys are used in the form of bare wire with just a small patch of insulation for commutation.

Rotor 30 is referred to as a "partial coil rotor" because its conductor 36 does not form a complete loop. A more specific description is provided with reference to some imaginary points, lines, and planes. In particular, a center point 64 is defined as a point collinear with first journal point 38 and a second journal point 40, and is situated midway between journal points 38 and 40. An extreme peripheral point 66 is defined as a point on conductor 36 that is between rotor supports 12 and 14, and is furthest away from rotational axis 39. A plane 68 is defined by points 38, 40, and 66. A line of view 70 is defined as that line which is perpendicular to plane 68 and intersects center point 64. Given those definitions, conductor 36 (i.e., its longitudinal center line) extends less than 360 degrees around line of view 70. In FIG. 1, conductor 36 extends approximately 180 degrees around line of view 70 as indicated by angle 72. In FIG. 4, an optional conductor 74 also extends approximately 180 degrees around line of view 70 as indicated by the sum of angles 76 and 78. FIG. 11 shows a rotor 75 distributed less than 320 degrees around line of view 70 as indicted by the sum of angles 77 and 79. Rotor 75 is substantially bare wire with a small patch of insulation 81 on the front side and a second patch on the backside. The insulated patches 81 provide commutation.

Another embodiment of the invention is shown in FIGS. 5, 6, and 7 as top, front and end views, respectively. A motor 80 includes a horizontal electrically insulated base 82 made of wood. Two electrically conductive sheet metal rotor supports 84 and 86 are attached to base 82 and connect to the terminals of battery 20. Rotor supports 84 and 86 include integral tabs 88 and 90. When tabs 88 and 90 are pressed against the battery terminals, current from battery 20 is delivered to rotor 30 in a way similar to that of motor 10.

A variation of motor 80 is shown as motor 92 in FIGS. 8, 9, and 10 as top, front, and end views, respectively. The primary difference between motors 80 and 92 is the means of commutation. Motor 80 employs the same commutator 42 as motor 10. The commutator of motor 92, however, includes a flexible wire commutator arm 94 co-acting with a commutator segment 96. Segment 96 is an integral extension of a rotor 98. Commutator arm 94 is electrically coupled to battery 20. Rotation of rotor 98 causes segment 96 to timely make and break electrical contact with commutator arm 94 to commutate motor 92.

Although the invention is described with respect to a preferred embodiment, modifications thereto will be apparent to those skilled in the art. Therefore, the scope of the invention is to be determined by reference to the claims which follow.

I claim:

1. A toy motor comprising:

a first rotor support having a first journal bearing whose center is at a first journal point;

a second rotor support having a second journal bearing whose center is at a second journal point, said first journal point, and said second journal point defining a rotational axis;

a partial coil rotor having a first journal, a second journal, and a conductor therebetween, said partial coil rotor being rotatable about said rotational axis upon said first journal being rotatably supported by said first journal bearing and said second journal being rotatably supported by said second journal bearing, said partial coil rotor having an extreme peripheral point defined as a point on said conductor that is between said first rotor support and said second rotor support and furthest away from said rotational axis, said first journal point, said second journal point, and said extreme peripheral point defining a plane, a center point collinear with said first journal point and said second journal point and located midway therebetween, a line of view perpendicular to said plane and intersecting said center point, said conductor extending less than 360 degrees around said line of view;

a magnet having a magnetic field extending across said conductor; and a commutator alternately making and breaking continuity with said partial coil rotor as said partial coil rotor rotates about said rotational axis.

2. The toy motor of claim 1, further comprising a battery with a positive terminal at one end and a negative terminal at an opposite end, said magnet being magnetically attached to a side wall of said battery, and said first rotor support being attached to said positive terminal and said second rotor support being attached to said negative terminal.

3. The toy motor of claim 1, wherein said conductor has an electrical resistivity at least 50 percent greater than pure copper and greater than three micro-ohm-centimeters.

4. The toy motor of claim 2, further comprising a resilient band around said battery that urges said first rotor support toward said positive terminal and urges said second rotor support toward said negative terminal.

5. The toy motor of claim 1, further comprising an interrupted coating of electrical insulation distributed circumferentially around at least one of said first journal and said second journal to alternately make and break continuity between said conductor and at least one of said first journal bearing and said second journal bearing.

6. The toy motor of claim 1, wherein said conductor extends less than 320 degrees around said line of view.

7. The toy motor of claim 1, further comprising an electrically insulated sleeve over at least one of said first journal and said second journal to axially position said partial coil rotor along said rotational axis.

8. The toy motor of claim 1 further comprising a counterbalance flywheel attached to at least one of said first journal and said second journal to offset any imbalance of said partial coil rotor.

9. The toy motor of claim 4 further comprising an on-off switch having an insulator between said battery and one of said first rotor support and said second rotor support.

10. The toy motor of claim 1 wherein said conductor has a conductor diameter that is substantially equal to a journal diameter of said first journal and said second journal disregarding dimensional factors of any insulation that may be on said partial coil rotor.

11. The toy motor of claim 1, further comprising:

a horizontal electrically insulated base supporting said magnet; and a battery horizontally disposed on said horizontal electrically insulated base, said battery having a positive terminal at one end and a negative terminal at an opposite end with at least one of said positive terminal and said negative terminal being electrically coupled to at least one of said first rotor support and said second rotor support.

12. The toy motor of claim 11 wherein said positive terminal is electrically coupled to said first rotor support and said negative terminal is electrically coupled to said second rotor support.

13. The toy motor of claim 12 further comprising:
   a commutator segment on said partial coil rotor, said commutator segment being displaced out of collinear alignment with said rotational axis; and
   a commutator arm electrically coupled to said battery and co-acting with said commutator segment to alternately make and break electrical continuity therebetween as said partial coil rotor rotates about said rotational axis.

14. A toy motor comprising:
   a first rotor support having a first journal bearing whose center is at a first journal point;
   a second rotor support having a second journal bearing whose center is at a second journal point, said first journal point and said second journal point defining a rotational axis;
   a partial coil rotor having a first journal, a second journal and a conductor therebetween, said partial coil rotor being rotatable about said rotational axis upon said first journal being rotatably supported by said first journal bearing and said second journal being rotatably supported by said second journal bearing, said partial coil rotor having an extreme peripheral point defined as a point on said conductor that is between said first rotor support and said second rotor support and furthest away from said rotational axis, said first journal point, said second journal point, and said extreme peripheral point defining a plane, a center point collinear with said first journal point and said second journal point and located midway therebetween, a line of view perpendicular to said plane and intersecting said center point, said conductor extending less than 320 degrees around said line of view;
   a magnet having a magnetic field extending across said conductor;
   a commutator alternately making and breaking continuity with said partial coil rotor as said partial coil rotor rotates about said rotational axis;
   a battery with a positive terminal at one end and a negative terminal at an opposite end, said magnet being magnetically attached to a side wall of said battery and said first rotor support being attached to said positive terminal and said second rotor support being attached to said negative terminal; and
   an interrupted coating of electrical insulation distributed circumferentially around at least one of said first journal and said second journal to alternately make and break continuity between said conductor and at least one of said first journal bearing and said second journal bearing.

15. The toy motor of claim 14 further comprising a resilient band around said battery urging said first rotor support toward said positive terminal and urging said second rotor support toward said negative terminal.

16. The toy motor of claim 15 further comprising an on-off switch having an insulator between said battery and one of said first rotor support and said second rotor.

17. The toy motor of claim 14 further comprising an electrically insulated sleeve over at least one of said first journal and said second journal to axially position said partial coil rotor along said rotational axis.

18. The toy motor of claim 14, further comprising:
   a horizontal electrically insulated base supporting said magnet; and
   a battery horizontally disposed on said horizontal electrically insulated base, said battery having a positive terminal at one end and a negative terminal at an opposite end with at least one of said positive terminal and said negative terminal being electrically coupled to at least one of said first rotor support and said second rotor support.

19. A toy motor comprising:
   a first rotor support having a first journal bearing whose center is at a first journal point;
   a second rotor support having a second journal bearing whose center is at a second journal point, said first journal point and said second journal point defining a rotational axis;
   a partial coil rotor having a first journal, a second journal, and a conductor therebetween, said conductor having a conductor diameter substantially equal to a journal diameter of said first journal and said second journal disregarding dimensional factors of any insulation that may be on said partial coil rotor, said partial coil rotor being rotatable about said rotational axis upon said first journal being rotatably supported by said first journal bearing and said second journal being rotatably supported by said second journal bearing, said partial coil rotor having an extreme peripheral point defined as a point on said conductor that is between said first rotor support and said second rotor support and furthest away from said rotational axis, said first journal point, said second journal point, and said extreme peripheral point defining a plane, a center point collinear with said first journal point and said second journal point and located midway therebetween, a line of view perpendicular to said plane and intersecting said center point, said conductor extending less than 190 degrees around said line of view;
   a magnet having a magnetic field extending across said conductor;
   a commutator alternately making and breaking continuity with said partial coil rotor as said partial coil rotor rotates about said rotational axis;
   a battery with a positive terminal at one end and a negative terminal at an opposite end, said magnet being magnetically attached to a side wall of said battery, and said first rotor support being attached to said positive terminal and said second rotor support being attached to said negative terminal;
   a resilient band around said battery urging said first rotor support toward said positive terminal and urging said second rotor support toward said negative terminal;
   an interrupted coating of electrical insulation distributed circumferentially around at least one of said first journal and said second journal to alternately make and break continuity between said conductor and at least one of said first journal bearing and said second journal bearing; and
   an on-off switch having an insulator between said battery and one of said first rotor support and said second rotor.

20. The toy motor of claim 19, further comprising:
   a horizontal electrically insulated base supporting said magnet; and
   a battery horizontally disposed on said horizontal electrically insulated base, said battery having a positive terminal at one end and a negative terminal at an opposite end with at least one of said positive terminal and said negative terminal being electrically coupled to at least one of said first rotor support and said second rotor support.

* * * * *